US012732422B2

(12) United States Patent
Gupta et al.

(10) Patent No.: US 12,732,422 B2
(45) Date of Patent: Sep. 8, 2026

(54) METHOD, SYSTEM, AND MEDIUM FOR DYNAMIC SLICING

(71) Applicant: Verizon Patent and Licensing Inc., Basking Ridge, NJ (US)

(72) Inventors: Umesh Kumar Gupta, Morris Plains, NJ (US); Muhammad Salman Nomani, Somerset, NJ (US); Jyotsna Kachroo, Millburn, NJ (US); Jun Yuan, Cranbury, NJ (US); Bjorn Hjelm, Livermore, CA (US); Helen J. Madden, Bernardsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 17/678,126

(22) Filed: Feb. 23, 2022

(65) Prior Publication Data

US 2023/0269136 A1 Aug. 24, 2023

(51) Int. Cl.

*H04L 41/0816* (2022.01)
*H04W 12/06* (2021.01)
*H04W 76/10* (2018.01)

(52) U.S. Cl.

CPC ......... *H04L 41/0816* (2013.01); *H04W 12/06* (2013.01); *H04W 76/10* (2018.02)

(58) Field of Classification Search

CPC ............. H04L 41/0816; H04L 41/0806; H04L 41/5019; H04L 41/5051; H04W 12/06; H04W 76/10

See application file for complete search history.

(56) References Cited

U.S. PATENT DOCUMENTS

2017/0289791 A1* 10/2017 Yoo ..................... H04W 68/005
2019/0053147 A1* 2/2019 Qiao ..................... H04W 48/18
2019/0357130 A1* 11/2019 Garcia Azorero .... H04W 12/06
2022/0166626 A1* 5/2022 Madisetti .................. H04L 9/50
2023/0171099 A1* 6/2023 Krishan ............. H04W 12/069 380/282

FOREIGN PATENT DOCUMENTS

WO WO-2023057081 A1 * 4/2023 ............ H04W 8/183

* cited by examiner

*Primary Examiner* — Joseph E Avellino
*Assistant Examiner* — Adam Joel Cerlanek

(57) ABSTRACT

Systems and methods described herein enable user-aware and application-aware dynamic slicing for mobile networks. A network device in a provider network receives a dynamic slice request from a client application. The dynamic slice request includes authorization credentials and a quality of service (QoS) indication for the client application. In response to the dynamic slice request, the network device generates a traffic descriptor value. The traffic descriptor value includes an access token that indicates the QoS authorized for the client application. The network device pushes updated UE Route Selection Policy (URSP) rules to a modem of the UE device, and also separately directs the traffic descriptor value to the client application. The network device receives, from the UE device, a protocol data unit (PDU) session establishment request that includes network slice selection information based on the traffic descriptor value.

20 Claims, 10 Drawing Sheets

METHOD, SYSTEM, AND MEDIUM FOR DYNAMIC SLICING

BACKGROUND

Advanced mobile networks (i.e., Fifth Generation (5G) and Sixth Generation (6G) networks) are being implemented as the next stage networks in the evolution of mobile wireless networks. These networks will have the capability to perform network slicing to increase network efficiency and performance. Network slicing is a form of virtual network architecture that enables multiple logical networks to be implemented on top of a common shared physical infrastructure. Each logical network, referred to as a "network slice," may encompass an end-to-end virtual network with dedicated storage and/or computational resources and may be configured to meet a different set of requirements.

DETAILED DESCRIPTION OF EXAMPLE EMBODIMENTS

Figure 1:
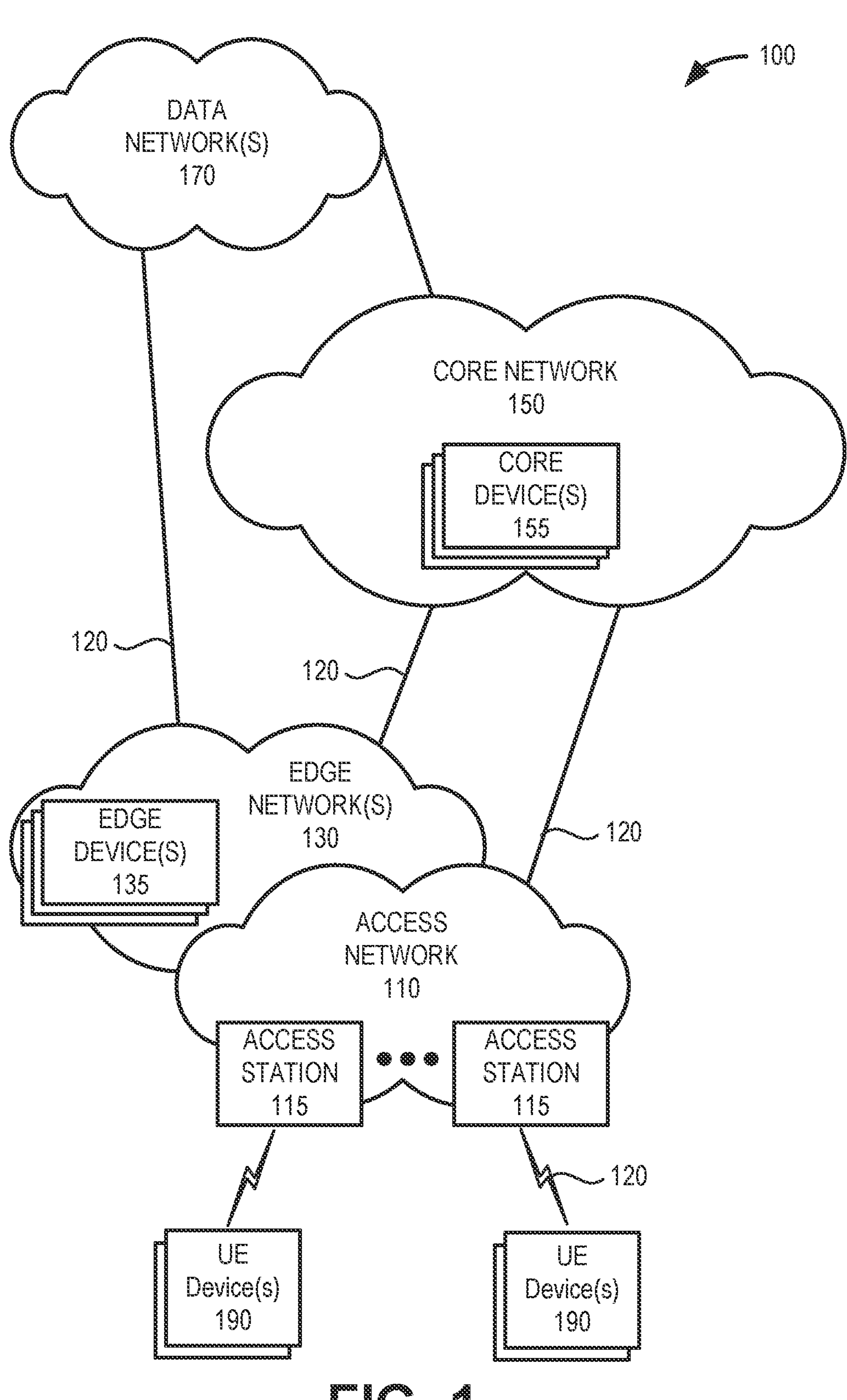
FIG. 1 is a diagram illustrating an environment in which an embodiment of a user-aware and application-aware dynamic slicing may be implemented.

The following detailed description refers to the accompanying drawings. The same reference numbers in different drawings may identify the same or similar elements. Also, the following detailed description does not limit the invention.

User equipment (UE) devices may execute various applications that generate network traffic with different service requirements. To better manage traffic for different types of applications, UE Route Selection Policies (URSP) have been proposed as a device-side feature in the 5G standalone (SA) architecture. The URSP framework provides traffic steering rules for the UE device and enables the UE device to determine how a certain application should be handled in the context of traffic routing to an appropriate network slice. A network slice refers to a complete logical network that may include components of a Radio Access Network (RAN) and Core Network. The logical network may provide certain telecommunication services and network capabilities that can vary from slice to slice. Selection of network slices for a particular application can, thus, have a significant impact on network performance and user experience.

In some cases, the same application may have different service requirements depending on the particular user or way the application is being used. The current URSP framework supports different types of Traffic Descriptors for mapping UE traffic by selecting appropriate routes that are pre-defined by operator (or carrier) policies. Different Traffic Descriptors are accorded different precedence or priorities. Current Traffic Descriptors may include, in order of precedence, Application Descriptors (App_ID), Internet Protocol (IP) Descriptors, Fully-Qualified Domain Name (FQDN), Non-IP Descriptors, Data Network Name (DNN), and Connection Capabilities. A UE device may apply different URSP rules for route selection based on, for example, the highest precedential Traffic Descriptor that is associated with an application.

A URSP is typically stored in the subscriber identity module (SIM)-like device (e.g., a SIM, an embedded SIM (eSIM), a Universal Integrated Circuit Card (UICC), embedded UICC (eUICC), etc.) or a modem of a UE device. Ideally, the URSP allows UE device to match an application, with its specific network service requirements, via the App_ID and/or other Traffic Descriptors, to a specific network slice that is configured to provide the required level of service for the application.

Systems and methods described herein enable user-aware and application-aware dynamic slicing for mobile networks. According to one implementation, a new enhanced Traffic Descriptor for the URSP framework allows quality of service (QoS) to be represented via a language-independent data format, such as a Java Script Object Notation (JSON) formatted structure, allowing the Traffic Descriptor to define both standard and custom values. In one example, the value of this new traffic descriptor field may be in the format of JSON Web Token (JWT), which can be signed and encrypted. The JWT may also indicate the App_ID of the client application that is allowed to receive the quality of service and, thus, allow governance at various levels, such as an operating system (OS), modem, etc. The OS may incorporate a modified communication interface to allow the new traffic descriptor to be passed to the modem, and the OS can perform governance, if desired. Each application and user may be authenticated using the above new traffic descriptor to provide maximum flexibility on slicing assignments. The OS and modem can use a Mobile Network Operator's (MNO) exposed public key to apply any governance by validating the JWT token (e.g., confirming that the token belongs to the requesting application).

According to another implementation, user-aware and application-aware dynamic slicing may be provided using existing traffic descriptors within the URSP framework. An access token, such as a JWT may be generated by the network and used to indicate the App_ID of the client application that is allowed to receive the quality of service. The client application may use the access token to request session establishment via the OS. The OS may incorporate a modified communication interface to interpret the access token, perform governance, and provide a corresponding traffic descriptor (e.g., within the URSP framework) to the modem.

FIG. 1 is a diagram illustrating an example environment 100 in which an embodiment of user-aware and application-aware dynamic slicing may be implemented. As illustrated, environment 100 includes an access network 110, edge networks 130, a core network 150, and one or more data networks 170. Access network 110 includes access stations 115, edge network 130 includes edge devices 135, and core network 150 includes core devices 155. Environment 100 further includes UE devices 190.

The arrangement of network devices and UE devices 190 illustrated in FIG. 1 is exemplary. A network device, a network element, or a network function (referred to herein simply as a network device) may be implemented according to one or multiple network architectures, and may include, for example, a client device, a server device, a peer device, a proxy device, a cloud device, a virtualized function, and/or another type of network architecture component (e.g., a component in Software Defined Networking (SDN), virtual, logical, network slicing, etc.). Additionally, a network device may be implemented according to various computing architectures, such as centralized, distributed, cloud (e.g., elastic, public, private, etc.), edge, fog, etc.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a network that incorporates IEEE 802.11 standards (e.g., a WI-FI network), a local area network (LAN), or another type of network that may provide an on-ramp to access stations 115 and/or core network 150.

Depending on the implementation, access network 110 may include one or multiple types of access stations 115. For example, access station 115 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, and so forth. According to an implementation, access stations 115 may include a gNB or its equivalent with multiple distributed components, such as a central unit (CU), a distributed unit (DU), a remote unit (RU or a remote radio unit (RRU)), or another type of component to support distributed arrangements.

Edge network 130 includes a platform that provides application services at the edge of a network, such as application services for UE devices 190. For example, edge network 130 may be implemented as a Multi-access Edge Compute (MEC) platform. Edge network 130 may be implemented using one or multiple technologies including, for example, network function virtualization (NFV), SDN, cloud computing, or another type of network technology. Edge network 130 may include network devices (e.g., edge devices 135) located to provide geographic proximity to various groups of access stations 115. In some embodiments, components of edge network 130 may be co-located with access station 115 in access network 110.

Core network 150 may include one or multiple networks of one or multiple types and technologies. For example, core network 150 may be implemented to include a next generation core (NGC) for a 5G network. In other implementation, core network 150 may also include an Evolved Packet Core (EPC) of an LTE, a core network of an LTE-Advanced (LTE-A) network, and/or a core network of an LTE-A Pro network. Core network 150 may also include a legacy core network.

Depending on the implementation, core network 150 may include various types of network devices, such as core devices 155. For example, core devices 155 may include 5G core components and/or combined 4G/5G core components, such as a user plane function (UPF), an access and mobility management function (AMF), a mobility and management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an embodiment, core device 155 includes logic that utilizes a URSP framework, as described herein.

Data network 170 may include one or multiple networks. For example, data network 170 may be implemented to include a service or an application-layer network, the Internet, an Internet Protocol Multimedia Subsystem (IMS) network, a Rich Communication Service (RCS) network, a cloud network, a packet-switched network, or other type of network that hosts an application or service. Depending on the implementation, data network 170 may include various network devices that provide various applications, services, or other type of device assets (e.g., servers (e.g., web, application, cloud, etc.), mass storage devices, data center devices), and/or other types of network services pertaining to various network-related functions.

UE devices 190 may each include a mobile device, such as wireless or cellular telephone device (e.g., a conventional cell phone with data processing capabilities), a smart phone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to access stations 115 in a wireless manner. As described further herein, UE devices 190 may work within a URSP framework to make dynamic slice requests and establish PDU sessions. In one implementation, UE devices

190 may use new enhanced traffic descriptor values described herein. In another implementation, UE devices 190 may apply existing traffic descriptors for URSP.

Figure 2:
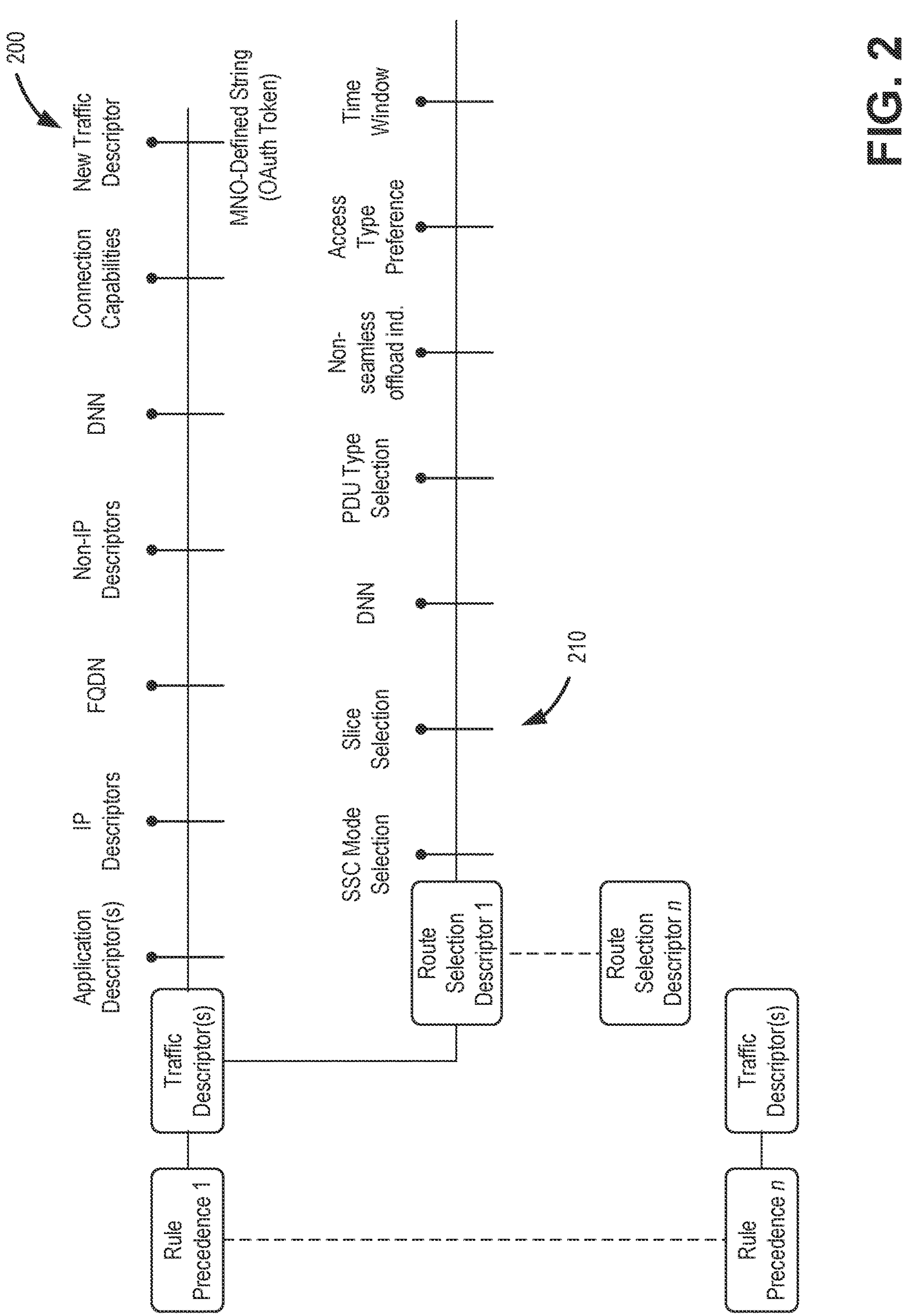
FIG. 2 is a diagram illustrating a new traffic descriptor to enhance a user equipment (UE) Route Selection Policies (URSP) framework.

FIG. 2 is a diagram illustrating a traffic descriptor to enhance the URSP framework. In the example of FIG. 2, an enhanced traffic descriptor 200 may be included in the URSP framework (such as 3GPP TS 24.526). Traffic descriptor 200 may allow quality of service to be represented via a JSON formatted structure, allowing definition of standard and custom values. Contents of traffic descriptor 200 may be, for example, an OAuth 2.0 access token in the format of a JWT. As described further herein, the OS of each UE device 190 (e.g., a UE equipped for 5G SA architecture) is expected to provide support in passing this value from the client application to the modem in the UE device 190. Also, if needed, the OS may apply governance by validating the token. As further shown in FIG. 2, selection of a traffic descriptor (e.g., traffic descriptor 200) leads to route selection descriptor (RSD) that may govern slice selection (e.g., slice selection 210). For example, based on URSP rules and the traffic description, a modem of UE device 190 may apply values in new traffic descriptor 200 to generate a protocol data unit (PDU) session establishment request that includes a slice identifier.

Figure 3:
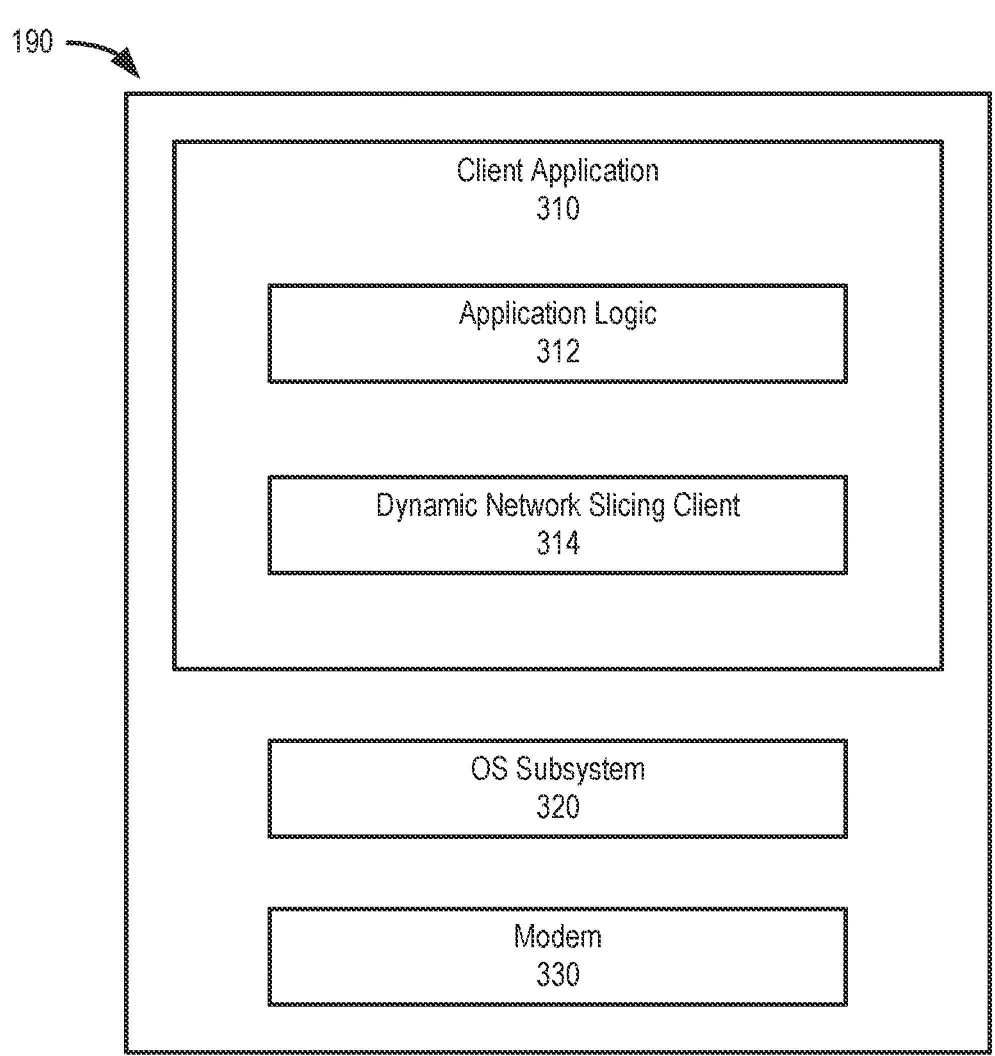
FIG. 3 is a block diagram illustrating logical components of a UE device for supporting user-aware and application-aware dynamic slicing.

FIG. 3 is a block diagram illustrating logical components of UE device 190 for supporting user-aware and application-aware dynamic slicing, according to implementations described herein. As shown in FIG. 3, UE device 190 may include client application 310, an OS subsystem 320, and a modem 330. Client application 310 may include application logic 312 and a dynamic network slicing client 314.

According to an embodiment, application logic 312 may include logic that provides a service pertaining to a software application. For example, application logic 312 may provide a streaming service, gaming service, shopping service, social media service, etc., for a user of UE device 190. Application logic 312 may request (e.g., based on configuration settings or an application server request) a traffic descriptor value (e.g., to indicate Quality of Service (QoS), etc.) for new traffic descriptor 200 for a given use case at a given time.

Dynamic network slicing client 314 may manage dynamic slice requests that are to be provided by the UE device 190 to the provider network for back-end processing. More particularly, dynamic network slicing client 314 may include a client-side service to generate a Dynamic Slice Request for slicing parameters indicated by application logic 312. In one embodiment, dynamic network slicing client 314 may be implemented through a Software Development Kit (SDK) that the MNO provides to the application developer. For example, the SDK may include software code and/or application program interfaces (APIs) to integrate Dynamic Slice Request capabilities into client application 310. In another embodiment, at least some features of dynamic network slicing client 314 may be implemented via an API provided by an OS via a system service. As described below, the Dynamic Slice Request may provide, for example, QoS parameters to a NSCM server/core network and request a corresponding Traffic Descriptor value for new traffic descriptor 200.

OS subsystem 320 may establish a connection between client application 310 and modem 330. In implementations described herein, OS subsystem 320 may communicate traffic descriptor values from application logic 312 to modem 330. For example, OS subsystem 320 may be configured to receive an access token value for the new traffic descriptor (e.g., new traffic descriptor 200) from client application 310 (via application logic 312) and provide the token value to modem 330. In some implementations, OS subsystem 320 may also provide a governance function to confirm that client application 310 is authorized to use the new traffic descriptor value.

Modem 330 may include, for example, a 5G/NR modem that performs processing, modulation, demodulation, and/or other signal processing for 5G/NR communications of UE device 190. Modem 330 may store URSP rules and/or access the URSP rules from a SIM, a SIM-like device, or another secure element (not shown) of UE device 190. According to implementations described herein, modem 330 may receive updated URSP rules from core network 150 in response to a Dynamic Slice Request initiated by dynamic network slicing client 314, and set up a PDU session for client application 310.

Figure 4:
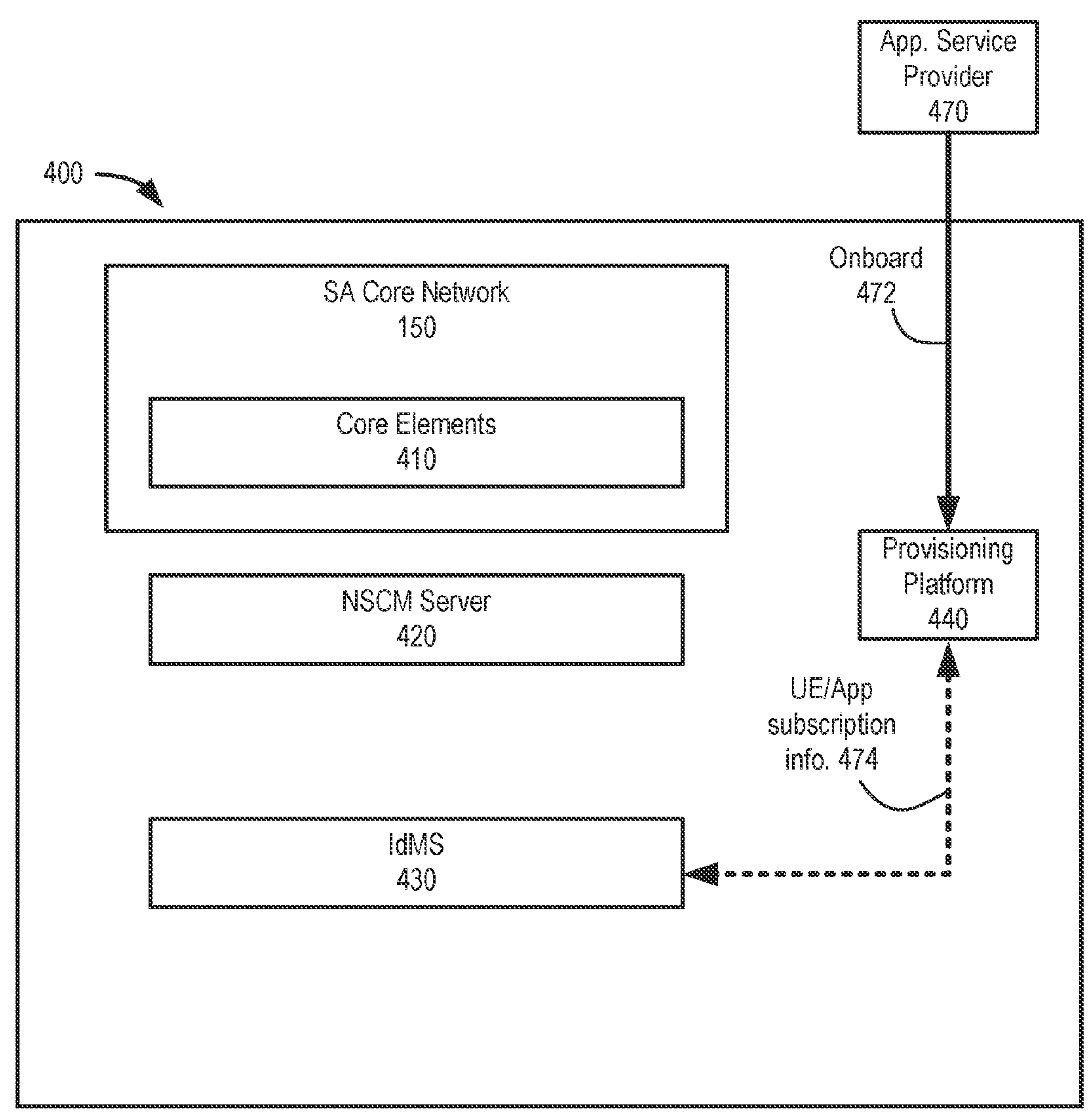
FIG. 4 is a block diagram illustrating logical components of a provider network for supporting user-aware and application-aware dynamic slicing.

FIG. 4 is a block diagram illustrating logical components of a provider network 400 for supporting user-aware and application-aware dynamic slicing, according to implementations described herein. Provider network 400 may provide a back-end configuration and processing for user-aware and application-aware dynamic slicing. According to an implementation, provider network 400 may be implemented in one or more of access network 110, edge network 130, core network 150, data network 170, and/or a different network. As shown in FIG. 4, provider network 400 may include standalone (SA) core network 150 with core elements 410, a Network Slice Capability Management (NSCM) server 420, an Identity Management Server (IdMS) 430, and a provisioning platform 440.

Core network 150 may include core elements 410 for a 5G SA architecture. For example, core network 150 may support network slicing and URSP. Core elements 410 may correspond to core devices 155 (FIG. 1). Core elements 410 may include, for example, a PCF, an SMF, and other elements for supporting URSP.

NSCM server 420 may manage Dynamic Slice Requests received from client applications 310. NSCM server 420 may perform authorization procedures, generate access tokens for the TD values, and initiate push communications to provide updated URSP rules (with the access token(s)) to a modem of UE device 190.

IdMS 430 may authenticate the identity of users and store information which identifies actions that users/subscribers are authorized to access and/or perform. IdMS 430 may include server backend components that issue access tokens, also referred to as authorization tokens, upon successful verification of users. The authorization framework may use an authorization layer such as OAuth 2.0 for credentials grant. The access tokens may be based on Java Script Object Notation (JSON) web tokens (JWTs) secured using digital signatures or Message Authentication Codes based on JSON Web Signature (JWS). IdMS 430 may access user profile information from, for example, provisioning platform 440.

Provisioning platform 440 may include one or more computer devices, such as server devices, to process orders for network services. The onboarding process allows a requester/customer to provision one or more network slices that will be available for an application running on one, many, or all UE devices 190. For example, a customer, such as an application service provider 470, may request a service for which a network slice may be used. As an example, application service provider 470 may request a communication service associated with different quality of service (QoS) for different types of users (e.g., enterprise users, subscribers, etc.). Provisioning platform 440 may store subscription information for users (e.g., users associated with a subscription for UE devices 190). The subscription information may be included within a user profile and may identify what slices a subscriber is allowed to access for a given application ID (App_ID). In other embodiments, functions of provisioning platform 440 may be distributed among other network components.

Provisioning platform 440 may be used for initial and/or updated configurations for an application service provider. In practice, provisioning of each application from an application service provider 470 may be performed prior to implementation of user-aware and application-aware dynamic slicing for that particular application (which is described further, for example, in connection with FIG. 5). Referring to FIG. 4, service requirements for an application are provided by the application service provider 470 as part of an onboarding process 472, in which the application service provider 470 may select user-aware and application-aware dynamic slicing for a particular application. Provisioning platform 440 may receive the selection from the application service provider 470 (indicating which slices/QoS a client application may use) and may store/forward 474 corresponding UE/application subscription information for eventual authorized access by IdMS 430.

FIGS. 3 and 4 illustrate exemplary logical components for UE device 190 and provider network 400. However, according to other embodiments, UE device 190 and provider network 400 may include additional, fewer, different, and/or differently-arranged logical components. For example, according to another embodiment, NSCM server 420 may be included within core network 150 or combined with another core element 410 in core network 150.

Figure 5:
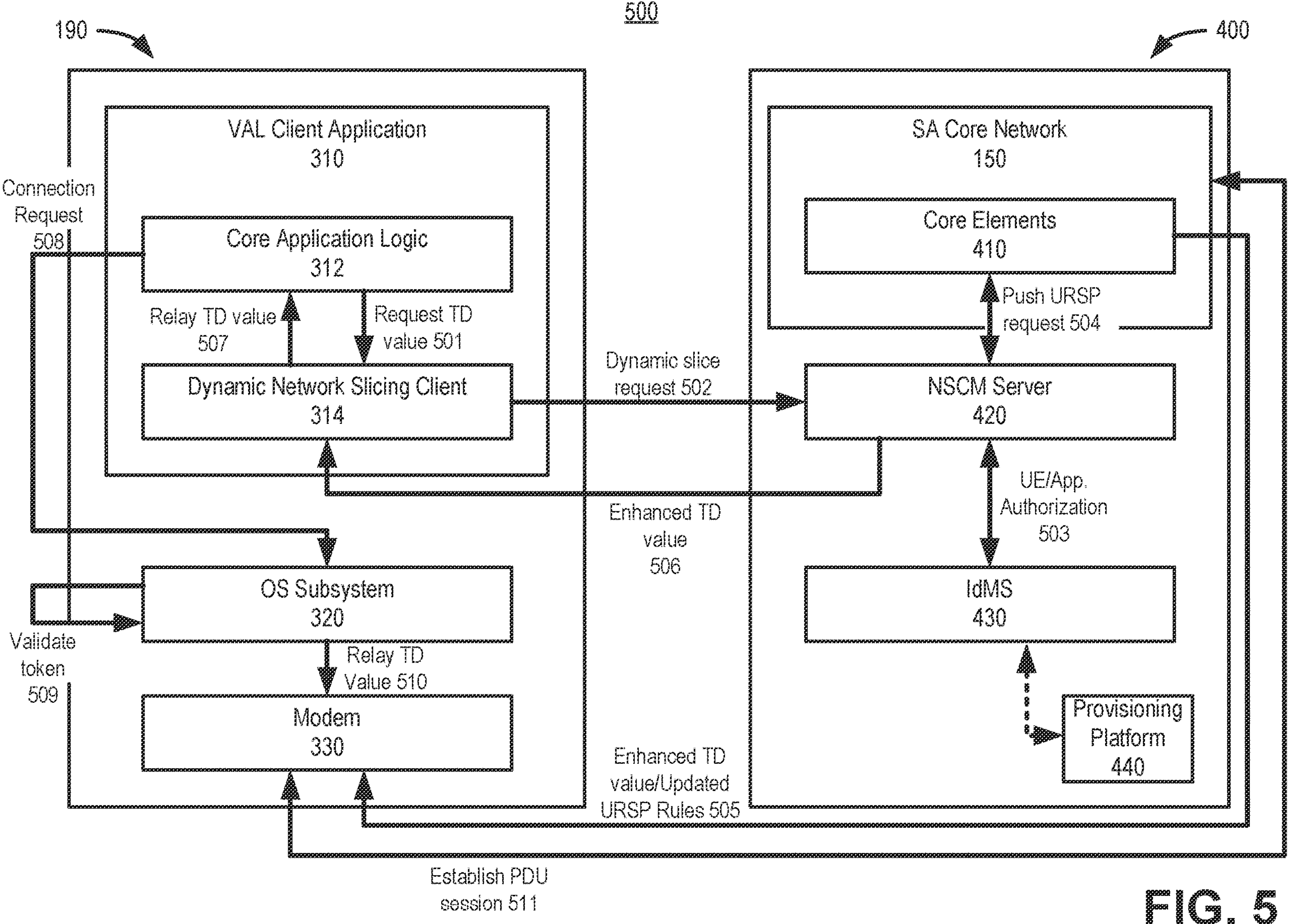
FIGS. 5 and 6 are diagrams illustrating communications for managing a dynamic slice request from a client application using enhanced traffic descriptors.

FIG. 5 is a diagram illustrating communications in a network portion 500 for managing a dynamic slice request from a client application, according to an implementation. Communications in FIG. 5 utilize dynamic network slicing client 314 and an enhanced traffic descriptor for the URSP framework. In the configuration of FIG. 5, UE device 190 and provider network 400 include components described above in connection with FIGS. 3 and 4. FIG. 5 provides a simplified illustration of communications in network portion 500 and is not intended to reflect every signal, communication, or intermediate points for exchanges between functions/devices.

As shown in FIG. 5, application logic 312 may send to dynamic network slicing client 314 a request 501 for a traffic descriptor (TD) value to establish dynamic slicing. For example, application logic 312 may request a specific QoS for a particular use case, activity, etc. for application 310. Dynamic network slicing client 314 may receive request 501 and send to NSCM server 420 a dynamic slice request 502 with related parameters for UE device 190 and application 310. The related parameters may include, for example, an App_ID, OAuth 2.0 credentials, requested QoS, an IP address, etc. NSCM server 420 may receive dynamic slice request 502 and use the parameters to perform UE/application authorization 503 with IdMS 430 (where IdMS 430 may retrieve corresponding profile data from provisioning platform 440, if necessary).

Assuming UE device 190 and application 310 are authorized for the requested QoS and slice parameters, IdMS 430 and/or NSCM server 420 may generate an access token (e.g., an OAuth 2.0 access token in form of a JWT) for the application as part of UE/application authorization 503. NSCM server 420 may then provide a request 504 for one or more of core elements 410 to push updated URSP rules (with the access token) to UE device 190. In response to request 504, core elements 410 may push 505 the access token and updated URSP rules to modem 330 of UE device 190. The updated URSP rules enable modem 330 to interpret/use, for example, custom values for the new traffic descriptor (e.g., new traffic descriptor 200). In addition to request 504, NSCM server 420 may also respond to a valid authorization 503 by sending 506 the requested traffic descriptor value to dynamic network slicing client 314. The requested traffic descriptor value may include the access token (e.g., the OAuth 2.0 access token in form of a JWT) for a corresponding slice. Dynamic network slicing client 314 may receive the traffic descriptor value and relay 507 the traffic descriptor value to application logic 312.

Upon receiving the traffic descriptor value, application logic 312 may use the appropriate OS communication method to allow application 310 to request set up 508 of a wireless (e.g., cellular) connection using the traffic descriptor value. OS subsystem 320 may receive the setup request 508 and, optionally, may perform a governance step 509 by validating that the access token (e.g., including the traffic descriptor value) provided by application logic 312 belongs to the requesting application. For example, OS subsystem 320 may obtain a public key (not shown) exposed by provider network 400 to validate the token.

In response to setup request 508 (and assuming a successful optional validation), OS subsystem 320 may relay 510 the access token (e.g., including the traffic descriptor value) to modem 330. Modem 330 may receive the access token, identify the traffic descriptor value, and apply the updated URSP rules (e.g., received via communication 505) for the traffic descriptor value. In response to the traffic descriptor value and based on the updated URSP rules, modem 330 may set up 511 a PDU session for application 310 using a slice to provide the requested QoS, after applying additional governance, if needed.

Figure 6:
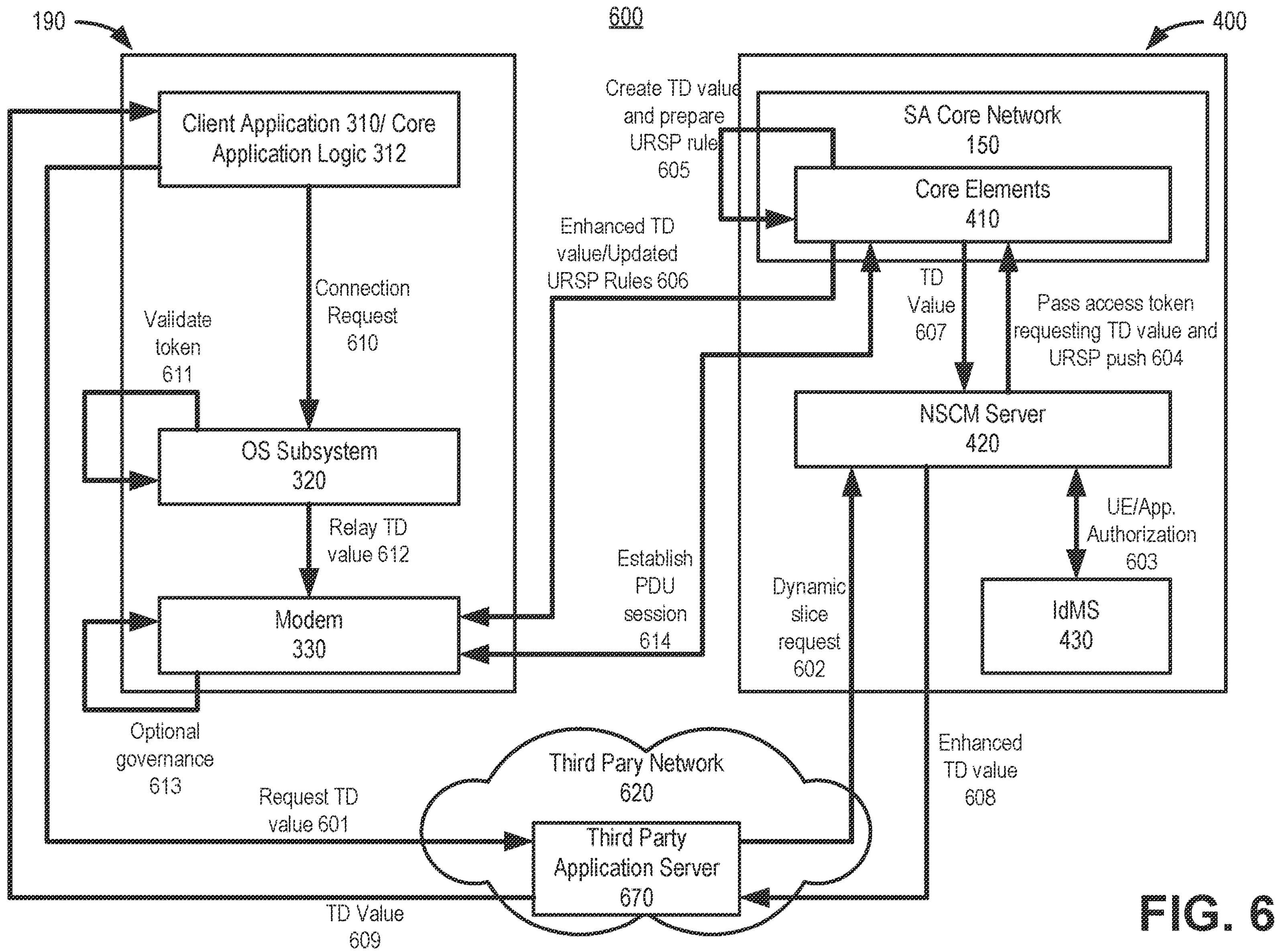

FIG. 6 is a diagram illustrating communications in a network portion 600 for managing a dynamic slice request from a client application, according to another implementation. In communications of FIG. 6, an enterprise mobile application utilizes an enhanced traffic descriptor for the URSP framework. As shown in FIG. 6, network portion 600 includes UE device 190, provider network 400, and third-party network 620. In the configuration of FIG. 6, UE device 190 and provider network 400 include components similar to those described above in connection with FIGS. 3 and 4. However, in the configuration of FIG. 6, client application 310 does not include dynamic network slicing client 314 (e.g., client application 310 and application logic 312 are essentially the same). FIG. 6 provides a simplified illustration of communications in network portion 600 and is not intended to reflect every signal, communication, or intermediate points for exchanges between functions/devices.

Third-party network 620 may be an enterprise network, for example, with which UE device 190 is affiliated. Third-party network 620 may include one or more application servers 670. Similar to application server 470 of FIG. 4, application server 670 may conduct onboarding process with a provisioning platform (not shown in FIG. 6) for an application and authorized users.

After network portion 400 completes provisioning for the application, client application 310 may request traffic descriptor (TD) value passing 601 by providing a device identity (e.g., an IP address) to the application server 670. In response, application server 670 may request a traffic descriptor value by passing a dynamic slice request 602 with parameters, such as an OAuth 2.0 token, QoS, device identity (e.g. IP address, IMEI, MDN etc.) from request 601, and App_ID of the client, to NSCM server 420. NSCM server 420 may perform authorization 603 and, based on the requested QoS in dynamic slice request 602, generate an access token via IdMS 430. As shown at reference 604, NSCM server 420 may pass the access token to core elements 410 requesting a traffic descriptor value and requesting that updated URSP be pushed to UE device 190.

Based on the scope defined in the access token, core elements 410 may create 605 a traffic descriptor value (e.g., an OAuth 2.0 access token in form of a JWT) for the indicated UE device (e.g., UE device 190) and prepare an updated URSP rule. Core elements 410 may then push 606 the new URSP, with the traffic descriptor value, to modem 330 of UE device 190. The updated URSP rules enable modem 330 to interpret/use standard or custom values for the new URSP traffic descriptor (e.g., new traffic descriptor 200). After the updated URSP rule is received by UE device 190, core elements 410 may return 607 the traffic descriptor value to NSCM server 420. NSCM server 420 may send 608 the access token with the traffic descriptor value to application server 670, and application server 670 may, in turn, relay 609 the traffic descriptor value to client application 310.

Upon receiving the traffic descriptor from application server 670, client application 310 may make a connection request 610 using the traffic descriptor. OS subsystem 320 may optionally perform a governance step 611 by validating that the JWT (e.g., in the traffic descriptor value) belongs to the requesting client application 310 by examining the token. An OS-provided connection class, for example, may support passing the new traffic descriptor value to modem 330 as a traffic descriptor under the URSP framework. Thus, upon receiving connection request 610, OS subsystem 320 may relay 612 the traffic descriptor value to modem 330.

Modem 330 may receive the traffic descriptor value. Modem 330 may optionally perform governance 613 by comparing the traffic descriptor value received from core elements 410 with the traffic descriptor value received from OS subsystem 320. Modem 330 may apply the updated URSP rules (e.g., also received via communication 606) to the traffic descriptor value and may set up 614 a PDU session for application 310 using a matching slice from the URSP.

Figure 7:
FIG. 7 is a flow diagram illustrating an exemplary process for providing user and application-aware dynamic slicing using enhanced traffic descriptors.
Figure 7:
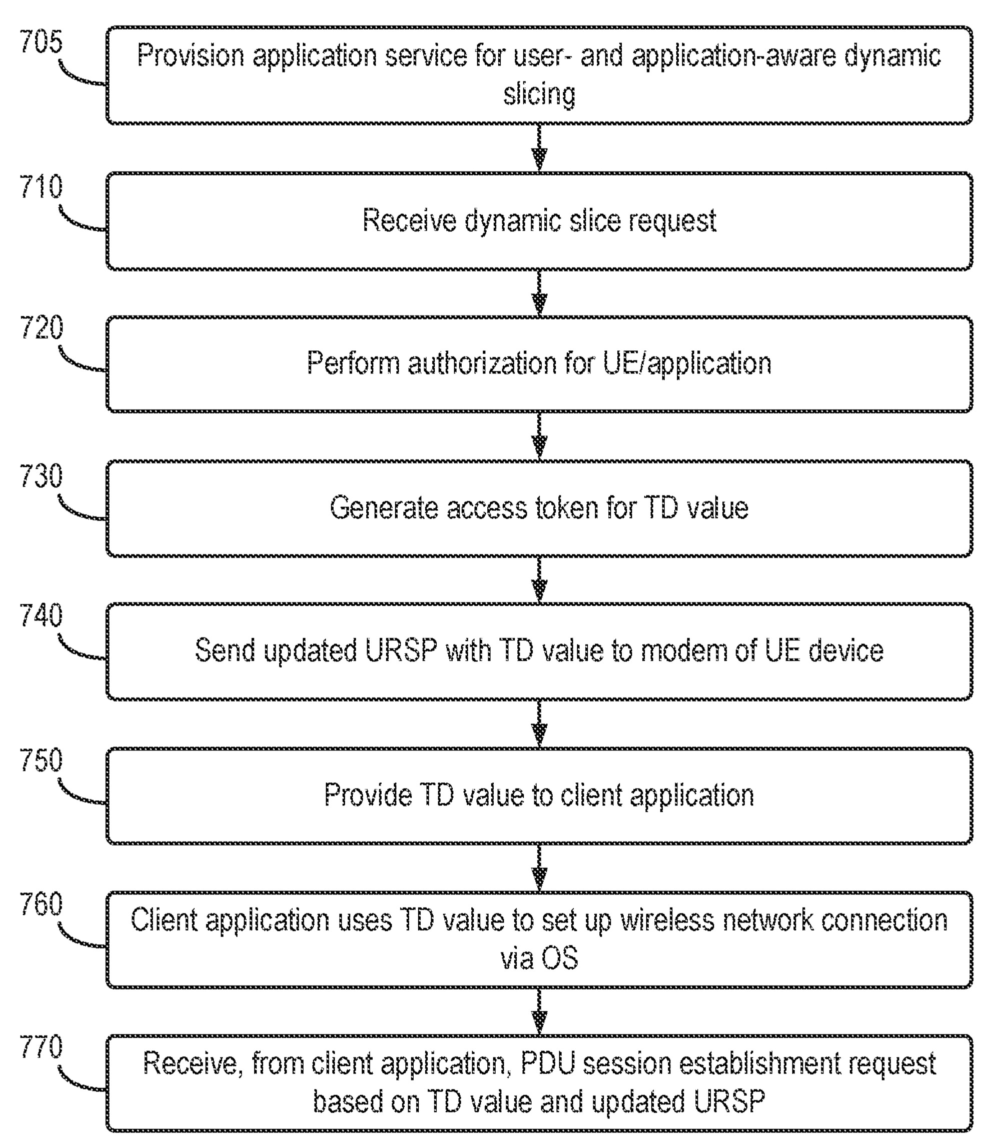

FIG. 7 is a flow diagram illustrating an exemplary process 700 for providing user and application-aware dynamic slicing using enhanced traffic descriptors. In one implementation, process 700 may be performed by devices in provider network 400. In another implementation, process 700 may be performed by devices in provider network 400 in conjunction with application server 670, UE device 190, and/or other devices in network environment 100.

Process 700 may include provisioning an application service for user-aware and application-aware dynamic slicing (block 705), and receiving, from a client application on the UE device, a Dynamic Slice Request (block 710). For example, as described in connection with FIG. 4, an application service provider may onboard an application and request user-aware and application-aware dynamic slicing be provided for certain conditions. Provider network 400 may provision services and a user list for the application and establish a user profile within provisioning platform 440. At some time after the provisioning, as described in connection with FIG. 5, a client application (e.g., client application 310 associated with application service provider 470) may provide a Dynamic Slice Request to request a traffic descriptor value for new traffic descriptor 200 to support a particular QoS. The client application may use dynamic network slicing client 314 to provide the request, along with required authorization-related parameters to provider network 400 (e.g., NSCM server 420). Alternatively, as described in FIG. 6, the client application may provide a request to application server 670, which in turn, provides the Dynamic Slice Request to provider network 400.

Process 700 may further include performing authorization for the UE device and application (block 720), generating an access token for a traffic descriptor value (block 730), sending updated URSP rules to a modem of the UE device (block 740), and providing the traffic descriptor value to the client application (block 750). For example, as described in connection with FIG. 5, NSCM server 420 may receive the dynamic slicing request from client application 310 (e.g., dynamic network slicing client 314), perform an authorization process with IdMS 430, generate an access token based on the request, and initiate a URSP rules update to be pushed to the modem of UE device 190. Based on the request from NSCM server 420, one or more core elements 410 may push the updated URSP rules, including the traffic descriptor value, to UE device 190 (e.g., modem 330). Separately, NSCM server 420 may direct the traffic descriptor value back to dynamic network slicing client 314. Alternatively, as described in FIG. 6, NSCM server 420 may send the traffic descriptor to application server 670, which in turn may direct the traffic descriptor value back to client application 310.

Process 700 may also include using the traffic descriptor to set up a wireless network connection via the OS (block 760), and receiving a PDU session establishment request based on the traffic descriptor value and the updated URSP rules (block 770). For example, as further described in connection with FIGS. 5 and 6, client application 310 may receive the TD value from NSCM server 420 and provide the TD value to OS subsystem 320 to set up a wireless connection. OS subsystem 320 may provide the TD value to modem 330, which may apply the updated URSP rules to establish a PDU session for client application 310.

Figure 8:
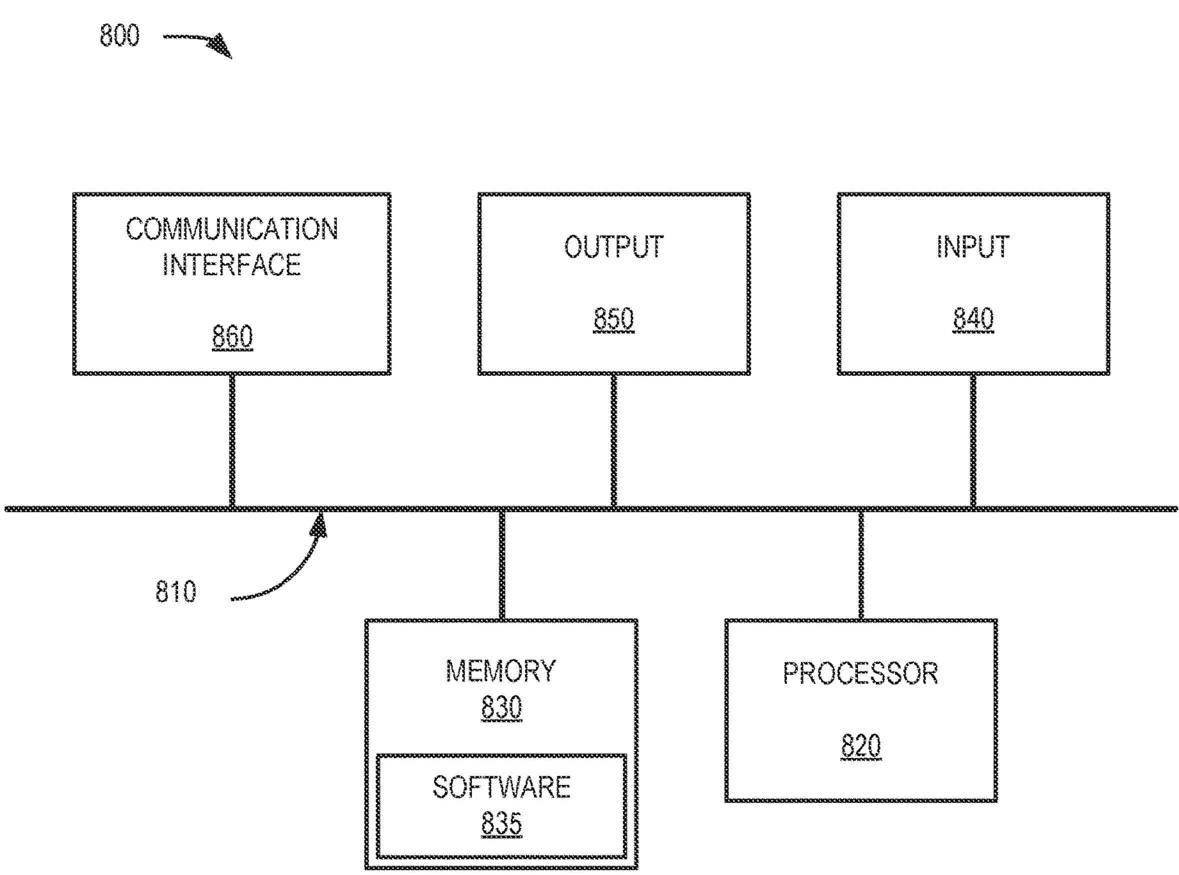
FIG. 8 is a diagram illustrating exemplary components of a device that may correspond to one or more of the devices illustrated and described herein.

FIG. 8 is a diagram illustrating exemplary components of a device 800 that may be included in one or more of the devices described herein. For example, device 800 may correspond to components included in access station 115, core devices 155, UE device 190, and/or devices of provider network 400. As illustrated in FIG. 8, device 800 includes a communications channel 810, a processor 820, a memory 830 with software 835, an input device 840, an output device 850, and a communication interface 860. According to other embodiments, device 800 may include fewer components, additional components, different components, and/or a different arrangement of components than those illustrated in FIG. 8 and described herein.

Communication channel 810 may include a path that permits communication among the components of device 800. Processor 820 may include a processor, a microprocessor, or processing logic that may interpret and execute instructions.

Memory 830 may include one or more types of dynamic storage devices that may store information and instructions, for execution by processor 820, and/or any type of non-volatile storage device that may store information for use by processor 820. With respect to UE device 190, memory 830 includes a memory device that stores information for providing URSP services, as described herein. For example, the memory device may be implemented as a SIM card, a UICC, an eUICC, a smart card, or another type of storage device. The memory device may include logic that stores and/or uses URSP Traffic Descriptors. The memory device may also store or include an operating system (e.g., OS subsystem 320), an application (e.g., client application 310), a program, a module, a script, or other type of entity that may execute instructions to provide the logic of the URSP framework.

Software 835 includes an application or a program that provides a function and/or a process. As an example, with respect to UE device 190 or another network device (e.g., NSCM server 420, etc.), software 835 may include code that, when executed by processor 820, provides a function for implementing dynamic slicing within a URSP framework, as described herein. Software 835 may also include firmware, middleware, microcode, hardware description language (HDL), and/or other form of instruction. Software 835 may further include an operating system (e.g., Windows, Linux, Android, iOS, proprietary, etc.).

Input device 840 may include a mechanism that permits a user to input information to device 800, such as a keyboard, a keypad, a button, a switch, touch screen, etc. Output device 850 may include a mechanism that outputs information to the user, such as a display, a speaker, one or more light emitting diodes (LEDs), etc.

Communication interface 860 permits device 800 to communicate with other devices, networks, systems, and/or the like. Communication interface 860 includes one or multiple wireless interfaces and/or wired interfaces. For example, communication interface 860 may include one or multiple transmitters and receivers, or transceivers. Communication interface 860 may operate according to a protocol stack and a communication standard. Communication interface 860 may include an antenna. Communication interface 860 may include various processing logic or circuitry (e.g., multiplexing/de-multiplexing, filtering, amplifying, converting, error correction, APIs, etc.). Communication interface 860 may be implemented as a point-to-point interface, a service based interface, etc. According to one implementation, communication interface 860 may implement one or more features of modem 330 described above.

Device 800 may perform certain operations in response to processor 820 executing software instructions (e.g., software 835) contained in a computer-readable medium, such as memory 830. A computer-readable medium may be defined as a non-transitory memory device. A non-transitory memory device may include memory space within a single physical memory device or spread across multiple physical memory devices. The software instructions may be read into memory 830 from another computer-readable medium or from another device. The software instructions contained in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

Device 800 may include fewer components, additional components, different components, and/or differently arranged components than those illustrated in FIG. 8. As an example, in some implementations, a display may not be included in device 800. As another example, device 800 may include one or more switch fabrics instead of, or in addition to, communications channel 810. Additionally, or alternatively, one or more components of device 800 may perform one or more tasks described as being performed by one or more other components of device 800.

Figure 9:
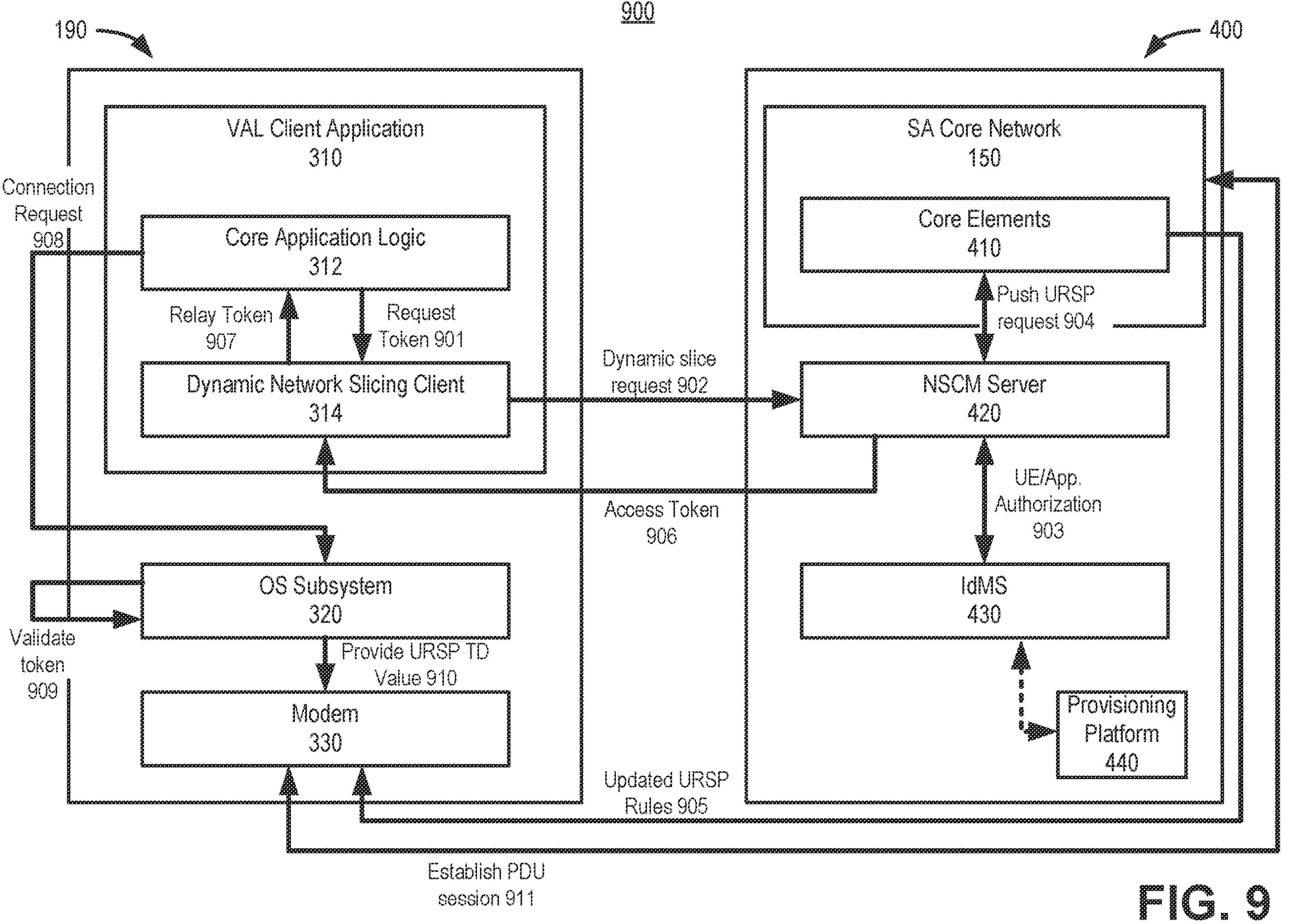
FIG. 9 is a diagram illustrating communications for managing a dynamic slice request from a client application without enhanced traffic descriptors.

FIG. 9 is a diagram illustrating communications in a network portion 900 for managing a dynamic slice request from a client application, according to another implementation. More particularly, FIG. 9 illustrates a use case for managing dynamic slicing requests using existing URSP traffic descriptors. As shown in FIG. 9, network portion 900 includes UE device 190 and provider network 400. In the configuration of FIG. 9, UE device 190 and provider network 400 include components similar to those described above in connection with FIGS. 3 and 4. FIG. 9 provides a simplified illustration of communications in network portion 900 and is not intended to reflect every signal, communication, or intermediate points for exchanges between functions/devices.

As shown in FIG. 9, application logic 312 may send to dynamic network slicing client 314 a request 901 for a token to establish dynamic slicing. For example, application logic 312 may request a specific QoS for a particular use case, activity, etc. for application 310. Dynamic network slicing client 314 may receive request 901 and send to NSCM server 420 a dynamic slice request 902 with related parameters for UE device 190 and application 310. The related parameters may include, for example, an App_ID, OAuth 2.0 token, requested QoS, an IP address, etc. NSCM server 420 may receive dynamic slice request 502 and use the parameters to perform UE/application authorization 903 with IdMS server 430 (where IdMS 430 may retrieve corresponding profile data from provisioning platform 440, if necessary).

Assuming UE device 190 and application 310 are authorized for the requested QoS and slice parameters, IdMS 430 and/or NSCM server 420 may generate an access token (e.g., an OAuth 2.0 access token in form of a JWT) for the application as part of UE/application authorization 903. NSCM server 420 may provide a request 904 for one or more of core elements 410 to push URSP to UE device 190. In contrast, for example, to requests 504 and 604 described above, request 904 may include slice/service requirements for the application, but not the access token. In response to request 904, core elements 410 may push 905 updated URSP rules to modem 330 of UE device 190. The updated URSP rules enable modem 330 to apply, for example, a URSP traffic descriptor for application 310 that would otherwise not be permitted. In addition to request 904, NSCM server 420 may also respond to a valid authorization 903 by sending 906 the requested token to dynamic network slicing client 314. The requested token may include the access token (e.g., the OAuth 2.0 access token) for a corresponding slice. Dynamic network slicing client 314 may receive the token and relay 907 the token to application logic 312.

Upon receiving the traffic descriptor value, application logic 312 may use the appropriate OS communication method to allow application 310 to request set up 908 of a wireless (e.g., cellular) connection using the URSP traffic descriptor value. OS subsystem 320 may receive the setup request 908 and, optionally, may perform a governance step 909 by validating that the token provided by application logic 312 belongs to the requesting application.

In response to setup request 908 (and assuming a successful optional validation), OS subsystem 320 may interpret the token and accordingly pass 910 appropriate traffic descriptors to modem 330. The traffic descriptors may be part of the current URSP framework and consistent with the URSP rule earlier pushed to modem 330 (e.g., at step 905). Modem 330 may receive the URSP traffic descriptor value and apply the updated URSP rules (e.g., received via communication 905). In response to the traffic descriptor value and based on the updated URSP rules, modem 330 may set up 911 a PDU session for application 310 using a slice to provide the requested QoS.

While communications of FIG. 9 are shown in the context of using dynamic network slicing client 314, in another implementation, an enterprise server (e.g., third party application server 670) may be used in place of dynamic network slicing client 314. For example, similar to the description of FIG. 6, third party application server 670 may manage sending of the dynamic slice request (e.g., communication 902) and receiving a token (e.g., communication 906).

Figure 10:
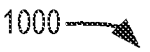
FIG. 10 is a flow diagram illustrating an exemplary process for providing user and application-aware dynamic slicing without using enhanced URSP traffic descriptors.
Figure 10:
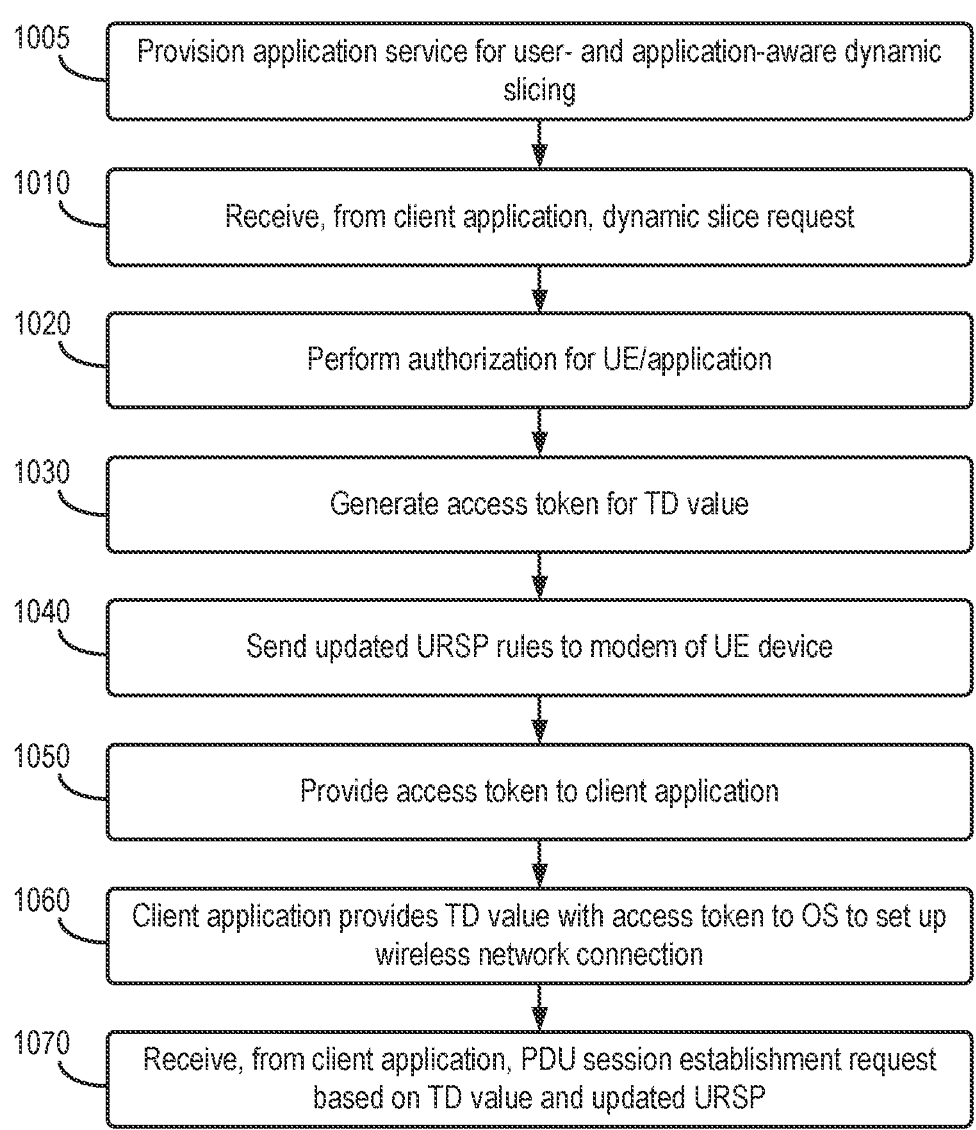

FIG. 10 is a flow diagram illustrating an exemplary process 1000 for providing user and application-aware dynamic slicing using traffic descriptors that currently exist within a URSP framework. In one implementation, process 1000 may be performed by devices in provider network 400. In another implementation, process 1000 may be performed by devices in provider network 400 in conjunction with UE device 190 and/or other devices in network environment 100.

Process 1000 may include provisioning an application service for user-aware and application-aware dynamic slicing (block 1005), receiving, from a client application on the UE device, a Dynamic Slice Request (block 1010), performing authorization for the UE device and application (block 1020), generating an access token for a traffic descriptor value (block 1030). For example, blocks 1005-1030 may be performed similar to blocks 605-630 of FIG. 6 described above, such that a unique access token is generated for an authorized application that request dynamic slicing.

Process 1000 may further include sending updated URSP rules to a modem of the UE device (block 1040), and providing the access token to the client application (block 1050). For example, as described in connection with FIG. 9, NSCM server 420 may receive the dynamic slicing request from client application 310 (e.g., dynamic network slicing client 314), perform an authorization process with IdMS 430 and generate an access token based on the request. NSCM server 420 may initiate a URSP rules update (e.g., without the access token) to be pushed to modem 330 of UE device 190, and separately direct the traffic descriptor value (e.g., in the form of the access token) back to dynamic network slicing client 314. Based on the request from NSCM server 420, one or more core elements 410 may push the updated URSP rules to UE device 190 (e.g., modem 330).

Process 1000 may also include using the traffic descriptor to set up a wireless network connection via the OS (block 1060), and receiving a PDU session establishment request based on the traffic descriptor value and the updated URSP rules (block 1070). For example, as further described in connection with FIG. 9, client application 310 may receive the TD value from NSCM server 420 and provide the TD value to OS subsystem 320 to set up a wireless connection. OS subsystem 320 may decipher the access token with the TD value and provide a corresponding traffic descriptor within the URSP framework to modem 330, which may apply the updated URSP rules to establish a PDU session for client application 310.

Systems and methods described herein enable user-aware and application-aware dynamic slicing for mobile networks. According to an implementation, a network device in a mobile network receives a dynamic slice request from a client application. The dynamic slice request includes authorization credentials and a quality of service (QoS) indication for the client application. In response to the dynamic slice request, the network device generates a traffic descriptor value. The traffic descriptor value includes an access token that indicates the QoS authorized for the client application. The network device pushes an updated URSP (also referred to as URSP rules) to a modem of to the UE device, and also separately directs the traffic descriptor value to the client application. The network device receives, from the UE device, a protocol data unit (PDU) session establishment request that includes network slice selection information based on the traffic descriptor value.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks and/or signals have been described with regard to the processes illustrated in FIGS. 5-7, 9 and 10, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 820, etc.), or a combination of hardware and software (e.g., software 835).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 820) of a device. A non-transitory storage medium includes one or more of the storage mediums described in relation to memory 830.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:

receiving, by one or more network devices and from a client application on a user equipment (UE) device, a dynamic slice request for a traffic descriptor value, wherein the dynamic slice request includes an application identifier for the client application, authorization credentials, and a quality of service (QoS) parameter for the client application;

generating, by the one or more network devices and in response to the dynamic slice request, an access token for the traffic descriptor value, wherein the access token is secured using a digital signature and indicates the application identifier and the QoS parameter authorized for the client application;

initiating, by the one or more network devices and, in response to the dynamic slice request, push communications by a core network to provide updated UE Route Selection Policy (URSP) rules, including the access token, to a modem of the UE device, wherein the updated URSP rules associate the traffic descriptor value with a network slice identifier;

sending, by the one or more network devices and based on the dynamic slice request and separately from the push communications, the traffic descriptor value, including the access token, to the client application; and receiving, by the one or more network devices and from the UE device, a protocol data unit (PDU) session establishment request that includes network slice selection information based on the traffic descriptor value.

2. The method of claim 1, wherein the traffic descriptor value comprises a custom traffic descriptor value for a URSP framework.

3. The method of claim 1, wherein the access token includes a Java Script Object Notation (JSON) formatted structure.

4. The method of claim 1, wherein the access token includes a Java Script Object Notation (JSON) Web Token (JWT).

5. The method of claim 1, wherein the traffic descriptor value is included in a designated traffic descriptor for a URSP framework.

6. The method of claim 1, wherein the network slice identifier is associated with a network slice that is configured to support the authorized QoS.

7. The method of claim 1, wherein the traffic descriptor value is communicable from an operating system (OS) of the UE device to the modem of the UE device.

8. The method of claim 1, wherein the client application includes a Network Slice Capability Management (NSCM) client configured to generate the dynamic slice request.

9. The method of claim 1, wherein sending the traffic descriptor value is performed by the one or more network devices outside the core network.

10. The method of claim 1, further comprising:

authenticating, prior to the generating, the UE device and the client application based on the dynamic slice request.

11. A system comprising:

one or more network devices including one or more processors configured to:

receive, from a user equipment (UE) device, a dynamic slice request for a traffic descriptor value, wherein the dynamic slice request includes an application identifier for the client application, authorization credentials, and a quality of service (QoS) parameter for the client application;

generate, in response to the dynamic slice request, an access token for the traffic descriptor value, wherein the access token is secured using a digital signature and indicates the application identifier and the QoS parameter authorized for the client application;

initiate, in response to the dynamic slice request, push communications by a core network to provide updated UE Route Selection Policy (URSP) rules, including the access token, to a modem of the UE device, wherein the updated URSP rules associate the traffic descriptor value with a network slice identifier;

send, based on the dynamic slice request and separately from the push communications, the traffic descriptor value, including the access token, to the UE device; and receive, from the UE device, a protocol data unit (PDU) session establishment request that includes network slice selection information based on the traffic descriptor value.

12. The system of claim 11, wherein the updated URSP includes a network slice identifier corresponding to the authorized QoS.

13. The system of claim 11, wherein the access token includes a Java Script Object Notation (JSON) formatted structure.

14. The system of claim 11, wherein the updated URSP rules associate the traffic descriptor value with a network slice identifier, and wherein the network slice identifier is associated with a network slice that is configured to support the authorized QoS.

15. The system of claim 11, wherein the traffic descriptor value comprises a custom traffic descriptor value for a URSP framework.

16. The system of claim 11, wherein the traffic descriptor value is communicable from an operating system (OS) of the UE device to the modem of the UE device.

17. The system of claim 11, wherein the one or more processors are further configured to:

receive, from an application service provider, service requirements for the client application to receive dynamic slicing service.

18. A non-transitory computer-readable storage medium storing instructions, executable by one or more processors, for:

receiving, by one or more network devices and from a client application on a user equipment (UE) device, a dynamic slice request for a traffic descriptor value, wherein the dynamic slice request includes an application identifier for the client application, authorization credentials, and a quality of service (QoS) parameter for the client application;

generating, by the one or more network devices and in response to the dynamic slice request, an access token for the traffic descriptor value, wherein the access token is secured using a digital signature and indicates the application identifier and the QoS parameter authorized for the client application;

initiating, by the one or more network devices and in response to the dynamic slice request, push communications by a core network to provide updated UE Route Selection Policy (URSP) rules, including the access token, to a modem of the UE device, wherein the updated URSP rules associate the traffic descriptor value with a network slice identifier;

sending, by the one or more network devices and based on the dynamic slice request and separately from the push communications, the traffic descriptor value, including the access token, to the client application; and receiving, by the one or more network devices and from the UE device, a protocol data unit (PDU) session establishment request that includes network slice selection information based on the traffic descriptor value.

19. The non-transitory computer-readable storage medium of claim 18, further comprising instructions for:

verifying authorization for the UE device and the client application based on the dynamic slice request.

20. The non-transitory computer-readable storage medium of claim 18, wherein the traffic descriptor value comprises a custom traffic descriptor value for a URSP framework.

* * * * *